United States Patent
White et al.

(10) Patent No.: US 7,370,335 B1
(45) Date of Patent: May 6, 2008

(54) SYSTEM AND METHOD FOR PROVIDING A PUBLIC APPLICATION PROGRAM INTERFACE

(75) Inventors: Eric R. White, Austin, TX (US); John D. Dwyer, Dripping Springs, TX (US); Christopher A. Hajdu, Austin, TX (US); Claiborne H. Johnson, III, Austin, TX (US); John H. Martin, Austin, TX (US)

(73) Assignee: Vignette Corporation, Austin, TX (US)

( * ) Notice: Subject to any disclaimer, the term of this patent is extended or adjusted under 35 U.S.C. 154(b) by 546 days.

(21) Appl. No.: 10/036,980

(22) Filed: Dec. 31, 2001

Related U.S. Application Data (60) Provisional application No. 60/334,445, filed on Nov. 29, 2001.

(51) Int. Cl.
  *G06F 3/00* (2006.01)
  *G06F 9/44* (2006.01)
  *G06F 9/46* (2006.01)
  *G06F 13/00* (2006.01)
  *G06Q 10/00* (2006.01)
  *G06Q 30/00* (2006.01)

(52) U.S. Cl. .................. 719/328; 719/320; 705/1; 718/106

(58) Field of Classification Search ............. 709/106; 717/102; 707/102; 719/310, 328–330; 705/1–9; 718/106
See application file for complete search history.

(56) References Cited

U.S. PATENT DOCUMENTS

| | | | |
|---|---|---|---|
| 5,604,843 A * | 2/1997 | Shaw et al. ............ 358/1.1 |
| 6,516,356 B1 * | 2/2003 | Belknap et al. ........... 719/328 |
| 6,647,396 B2 * | 11/2003 | Parnell et al. ............ 707/102 |
| 6,675,230 B1 * | 1/2004 | Lewallen ................ 719/328 |
| 6,854,123 B1 * | 2/2005 | Lewallen ................ 719/328 |
| 7,027,997 B1 | 4/2006 | Robinson et al. |
| 2002/0052771 A1 * | 5/2002 | Bacon et al. ............ 705/8 |
| 2002/0133635 A1 * | 9/2002 | Schecter et al. ........... 709/310 |

(Continued)

FOREIGN PATENT DOCUMENTS

WO    WO 02/27510 A1    4/2002

OTHER PUBLICATIONS

David Hollingsworth, "Workflow Management Coalition The Workflow Reference Manual", Jan. 19, 1995.*

(Continued)

*Primary Examiner*—William Thomson
*Assistant Examiner*—Qing-Yuan Wu
(74) *Attorney, Agent, or Firm*—Sprinkle IP Law Group (57) ABSTRACT

One embodiment of the system of this invention can include software programming stored in a computer readable memory. The software programming can comprise a public API layer further comprising an object model containing generic software objects representing underlying workflow processes and functionality and an adapter layer comprising one or more adapters operable to map the generic software objects of the public API layer with the vendor-specific APIs of underlying workflow engines. The generic object model maintained by the public API layer can, in one embodiment of the present invention, comprise generic software objects corresponding to the reference model developed by the Workflow Management Coalition. In this manner, the public API layer can present an interface based on industry standards.

25 Claims, 3 Drawing Sheets

U.S. PATENT DOCUMENTS

2003/0005406 A1* 1/2003 Lin et al. ............. 717/102
2003/0023662 A1* 1/2003 Yaung ............. 709/106

OTHER PUBLICATIONS

"Workflow Management Coalition Terminology & Glossary," Jun. 1996, Workflow Management Coalition, issue 2.0, pp. 1-55.*

Vignette, VCM Workflow, 11 pages (Sealed), Oct. 25, 2001 Under Seal.

Acom VCM Workflow Functional Specification, Acom Workflow Team 81 pages (Sealed), Nov. 9, 2006 Under Seal.

Workflow Management Coalition, "Workflow Management Coalition Workflow Security Considerations—White Paper", pp. 1-15, Feb. 1998.

Workflow Management Coalition, "Workflow Management Coalition Terminology & Glossary", pp. 1-65, Feb. 1999.

Workflow Management Coalition, "Workflow and Internet: Catalysts for Radical Change, A WfMC White Paper", pp. 1-31, Jun. 1998.

Workflow Management Coalition, "The Workflow Reference Model", pp. 1-55, Jan. 19, 1995.

Interworkflow Application Model: The Design of Cross-Organizational Workflow Processes and Distributed Operations Management, Groupware Technical Sub-Committee1, the Japanese Standards Association, pp. 1-131, Feb. 1997.

Development and Experimental Proof of Interworkflow Management System, presentation of ARK and Kanagawa, pp. 1-19.

Workflow Management Coalition, "Workflow Management Coalition Interface 1: Process Definition Interchange Process Model," pp. 1-100, Oct. 29, 1999.

Workflow Management Coalition, "Workflow Management Coalition Interface 1: Process Definition Interchange Process Model," pp. 1-97, Aug. 5, 1998.

Workflow Management Coalition, "Workflow Management Coalition Interface 1: Process Definition Interchange Process Model," pp. 1-89, Jul. 15, 1998.

Workflow Management Coalition, "Workflow Management Coalition Interface 1: Process Definition Interchange Organisational Model," pp. 1-40, Jul. 15, 1998.

Workflow Management Coalition, "Interface 1: Process Definition Interchange Q&A and Examples", pp. 1-45, Jan. 1, 1999.

Workflow Management Coalition, "Workflow Management Coalition Interface 1: Process Definition Interchange Process Model," pp. 1-60, Jul. 15, 1998.

Workflow Management Coalition, "Workflow Management Coalition Workflow Client Application (Interface 2) Application Programming Interface (WAPI) Specification," pp. 1-178, Oct. 1997.

OMG BODTF REP#2 Submission, Workflow Management Facility, Revised Submission, pp. 1-93, Jul. 4, 1998.

Workflow Management Coalition, "Workflow Management Application Programming Interface (Interface 2&3) Specification," pp. 1-171, Jul. 1998.

Workflow Management Coalition, "Workflow Management Coalition Workflow Standard—Interoperability Wf-XML Binding", pp. 1-40, May 1, 2000.

Workflow Management Coalition, "Workflow Management Coalition Workflow Standard—Interoperability Internet e-mail MIME Binding", pp. 1-92, Jul. 6, 1998.

Workflow Management Coalition, "Workflow Management Coalition Workflow Standard—Interoperability Internet e-mail MIME Binding," pp. 1-105, Jul. 31, 1998.

Workflow Management Coalition, "Workflow Management Coalition Workflow Standard—Interoperability Abstract Specification", pp. 1-40, Nov. 30, 1999.

Kanaya, et al. "Workflow Standard—Interoperability XML-HTTP binding", pp. 1-66, Feb. 8, 2000.

Workflow Management Coalition, "Workflow Client Application (Interface 2) Application Programming Interface (WAPI) Specification", pp. 1-80, May 15, 1996.

Workflow Management Coalition, "Workflow Management Coaltion Workflow Standard—Interoperability Wf-XML Binding", pp. 1-57, Nov. 14, 2001.

Workflow Management Coalition, "Workflow Management Coalition White Paper—Events", pp. 1-11, Apr. 1999.

Workflow Management Coalition, "Workflow Classification Embedded & Autonomous Workflow Management Systems", pp. 1-7, Mar. 10, 2000.

Workflow Management Coalition, "A Common Object Model Discussion Paper", pp. 1-16, Jan. 1998.

Anderson, et al., "Workflow Interoperability—Enabling E-Commerce", pp. 1-11.

Workflow Management Coalition, "Workflow Management Coalition Workflow Client Application (Interface 2) Application Programming Interface (WAPI) Naming Conventions," pp. 1-21, Nov. 1997.

Workflow Management Coalition, "Workflow Management Coalition Audi Data Specification," pp. 1-33, Jul. 15, 1998.

SilverStream eXtend Director, Chapter 1 "About Workflow", Version 4.0, released Jul. 2002, 4 pages: http://www.novell.com/documentation/director4/docs/help/books/wfAbout.html, Jun. 4, 2007.

API documentation process series: Creating Javadoc API documentation with directly updated source, May 9, 2006, 5 pages: http://www.ibm.com/developerworks/rational/library/06/0509_alupului/index.html, Jun. 4, 2007.

IBM WebSphere Develop Technical Journal: Introducing the WebSphere Portal V6.0 Content API, Jul. 26, 2006, 9 pages http://www-128.ibm.com/developerworks/websphere/techjournal/0607_kubik/0607_kubik.html, Jun. 4, 2007.

* cited by examiner

FIG. 6

SYSTEM AND METHOD FOR PROVIDING A PUBLIC APPLICATION PROGRAM INTERFACE

RELATED INFORMATION

This Application claims priority under 35 U.S.C. § 119(e) to provisional application Ser. No. 60/334,445, filed Nov. 29, 2001 entitled "Extensible Workflow Architecture" which is hereby fully incorporated by reference.

TECHNICAL FIELD OF THE INVENTION

The present invention relates generally to business process management. More particularly, the present invention relates to systems and methods for workflow management. Even more particularly, the present invention relates to systems and methods for providing a common public API to interface with disparate workflow engines.

BACKGROUND OF THE INVENTION

Organizations employ a variety of processes to achieve organizational and/or business goals. Oftentimes, these processes can involve both manual and automated activities. In other words, the processes require both human action and machine-based (e.g., software or computer driven) action. To better achieve overall business and/or organizational goals, organizations are increasingly relying on workflow management to streamline their processes and activities. Workflow management typically focuses on how a product (i.e., a "workflow") flows through a particular process. In the context of a manufacturing line, for example, workflow management can be used to streamline how "work in process" matriculates through the manufacturing line. As another example, in the context of web design, workflow management can focus on how content is manipulated for deployment on the worldwide web.

To implement workflow management techniques, many organizations utilize software packages or "workflow engines" provided by software vendors. Depending on the functionality provided by a particular workflow engine, the organization can initiate actions based on the occurrence of certain events defined by the organization. Based on the process definition (i.e., a computer prosecutable representation of a real-world process), the workflow engine can initiate various actions to aid an actual implementation of a process. For example, if a content provider defined a process to include the activities of authoring and editing content, the workflow engine can be configured to notify an editor (e.g., via email, paging or other media) when the author has finished working on a particular content item. In this manner, the editor will know almost immediately when he or she can edit the content item.

As workflow management has evolved, software vendors have deployed a wide range of workflow engines. Each software vendor typically developed a specific workflow engine based on the needs of a customer. Thus, while many workflow engines are available, each engine often possesses particular functional capabilities, strengths and weaknesses. In order to utilize a particular workflow engine, an organization must generally develop applications that interface with the workflow engine through the workflow engine's application program interface (API). As would be understood by those of ordinary skill in the art, an API is a set of routines, protocols and/or tools that can be used to develop applications that function with a particular workflow engine. Unfortunately, prior art workflow engines utilize proprietary APIs. This can present significant shortcomings for the deployment of workflow management tools across an enterprise or among cooperating, but disparate, enterprises.

As noted earlier, each workflow engine tends to have particular strengths and weaknesses, and a workflow engine that was previously adequate for an organization may now be unsatisfactory because the organization has changed size, processes, or so on. Because each workflow engine typically uses a vendor-specific API, the organization may be required to develop an entirely new set of workflow applications in order to utilize a new workflow engine. Thus, the organization is either left with an inadequate workflow management solution or must incur the additional expense of developing new applications. As an additional shortcoming, process definitions that were valid for one workflow engine may be invalid for another workflow engine. When an organization implements a new tier (i.e., deploys a new workflow engine), it may have to redevelop its entire process definitions.

To illustrate disparate means for implementing workflow engines and the shortcomings thereof, consider the following examples. IBM® has deployed a workflow engine using functional definition language (FDL). FDL is a text-based language that is essentially compiled, but it is not a programming language such as Java or C++. In order to use the IBM® workflow engine, an organization must develop applications that are compatible with FDL. On the other hand, BEA® Systems uses an XML-based language for process definition representation. Therefore, an organization's applications would have to be compatible with BEA's® process definition representation in order to utilize the BEA® Systems workflow engine. Additionally, both the IBM® workflow engine and the BEA® Systems workflow engine have completely different APIs. Thus, in order to implement both the BEA® Systems workflow engine and the IBM® workflow engine in the same workflow management system, the organization may have to develop two entirely different sets of process definitions and two entirely different sets of applications in order to interface with the respective APIs.

Figure 1:
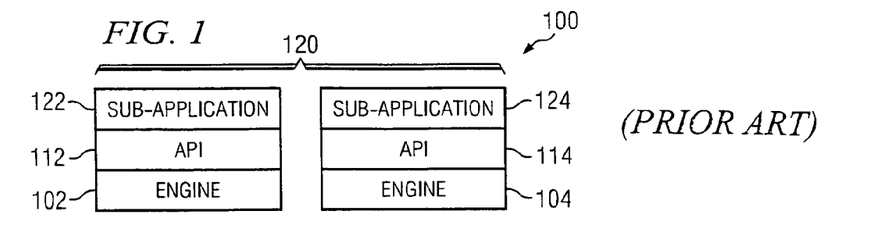
FIG. 1 illustrates one embodiment of a prior art system for interfacing applications with underlying workflow engines.

FIG. 1 further illustrates the shortcomings of prior art workflow management systems. Prior art workflow management systems can include multiple workflow engines (e.g., workflow engine 102 and workflow engine 104). Each workflow engine can include a proprietary API. For example, workflow engine 102 can include API 112 and workflow engine 104 can include API 114. For an application to run with each workflow engine, the application must be tailored to the proprietary APIs. Thus, in the embodiment of FIG. 1, a particular application 120 can be divided between sub-application 122 and sub-application 124. These applications can have the same functionality, but require customized programming to interface with API 112 and 114 respectively. If the organization implementing the workflow management system of FIG. 1 wants to interface application 120 with additional workflow engines, the organization must typically develop new sub-applications of application 120 to interface with the proprietary APIs of the new workflow engines. Because each workflow engine can employ a proprietary API, the organization can incur significant programming expenses adapting application 120 to each new workflow engine.

Several standards have been developed for the representation and implementation of workflow products interface. However, vendor-specific workflow engines have either not adopted these standards or have only partially adopted them.

Thus, organizations are left to implement heterogeneous workflow management products, each of which may be individually unsatisfactory for a particular organization's processes.

SUMMARY OF THE INVENTION

The present invention provides a systems and methods for providing a public application program interface that substantially eliminate or reduce disadvantages associated with previously developed workflow management systems. More particularly, embodiments of the present invention can provide a system and method for mapping vendor-specific workflow engine APIs to a standardized API.

One embodiment of the system of this invention can include software programming stored in a computer readable memory. The software programming can comprise a public API layer, further comprising an object model containing generic software objects representing underlying workflow processes and functionality, and an adapter layer comprising one or more adapters operable to map the generic software objects of the public API layer with the vendor-specific APIs of underlying workflow engines. The object model maintained by the public API layer can, in one embodiment of the present invention, comprise generic software objects corresponding to the reference model developed by the Workflow Management Coalition. In this manner, the public API layer can present an interface based on industry standards.

Additionally, embodiments of the present invention can include content management functionality. For example, in one embodiment of the present invention, the public API layer can maintain an object to represent a payload that, in turn, can associate content items with a particular workflow process instance. The use of a payload object can facilitate integration of workflow management tools with content management tools.

Embodiments of the present invention provide a technical advantage because they allow applications to be written for a common public API rather than for vendor-specific APIs. Therefore, the same application can be applied to multiple underlying workflow engines without significant reprogramming.

Another technical advantage of the embodiments of the method and system of the present invention is that the standardized API layer allows new workflow engines to be more easily deployed in a system already utilizing other workflow engines (i.e., new workflow engines can be "plugged-in").

Embodiments of the present invention provide yet another technical advantage by allowing users to integrate several workflow engines, thereby allowing an organization to exploit the strengths of vendor-specific workflow engines without having to write separate applications for each vendor specific API.

As an additional technical advantage provided by embodiments of the present invention, the costs for deployment of new workflow engines can be significantly reduced because reprogramming to account for changes in workflow engine APIs can occur at the adapter layer rather than at the application layer.

The present invention provides yet another technical advantage because the user is insulated from proprietary engine dependencies, thus enabling integration and migration among an extensible set of workflow engines when technical, economic, and system considerations warrant.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of the various drawings.

For the purposes of this application, the term "process definition" can mean a representation of a number of discrete activity steps with associated computer and/or human operations and rules governing the progression of the process through the various activity steps. A "process instance" can mean a particular invocation of a process definition. In other words, a process instance can be the runtime manifestation of a process, based on the process definition. Each process definition can spawn multiple process instances, though typically each process instance will be associated with one and only one process definition. A "workflow engine" can be a software program operable to manipulate content items in accordance with a process definition. An "object" can be a self-contained data entity that can comprise data and/or procedures to manipulate data, and a "class" can be a category of objects.

Embodiments of the present invention provide a means to integrate a variety of vendor-specific workflow engines, each of which can have a custom application program interface (API). As would be understood by those of ordinary skill in the art, an API can provide a set of tools so that programmers can write applications consistent with a particular workflow engine. In other words, an API provides an abstraction layer for the underlying processes of a software tool. For example, many operating systems, such as Microsoft Windows, provide an API so that programmers can write applications consistent with the operating system.

Embodiments of the present invention can present a standardized public API that programmers can use to write applications consistent with various underlying workflow engines. One embodiment of the present invention can comprise a public API layer including a number of generic software objects representing the functional characteristics common to the underlying workflow engines. In other words, the public API layer can act as an abstraction layer for the functionality of specific workflow engines. Additionally, embodiments of the present invention can include an API adapter layer to translate instructions (i.e., calls) from the public API layer to vendor-specific instructions. Thus, an adapter can map vendor-specific APIs to the public API.

In one embodiment of the present invention, the public API can comprise objects based on industry standards for workflow management. For example, the public API layer can comprise objects based on the workflow reference model developed by the Workflow Management Coalition. In this embodiment, the adapters in the adapter layer can map the generic objects and processes of the public API (i.e. objects based on the Reference Model) to vendor-specific objects and processes. In this manner, embodiments of the present invention can present a consistent API for various underlying workflow engines, each of which may have its own custom API, and can thus provide a framework under which a large number of vendor-specific workflow engines can operate. Furthermore, application developers can be insulated from the proprietary engine dependencies of engine-specific APIs, enabling integration and migration among an extensible set of solutions when technical, economic and systems considerations warrant.

Because the present invention can map vendor-specific APIs to a standardized API, organizations can more easily deploy new workflow engines without having to discard incumbent workflow engines or significantly reprogram applications. This can allow an organization to leverage the strengths of particular workflow engines for managing specific processes. Additionally, the present invention can facilitate the evolution of new workflow technologies because applications can be written for the standardized API and can, in turn, be applied to multiple underlying workflow engines further allowing the strengths of individual workflow engines to be exploited by a single application.

In addition to a public API layer and adapter layer, embodiments of the present invention can include content management functionality that can comprise processes that are common to many applications, such as scheduling of tasks, and so on. Additionally, embodiments of the present invention can comprise a payload to index items that are the subject of a particular process instance. Because content items can be indexed by the present invention, applications based on the public API can rely on the present invention to locate content items, rather than having to constantly query persistent storage mechanisms in order to find the content that is being worked upon. Thus, the present invention can enable the integration of content management with workflow management.

Figure 2:
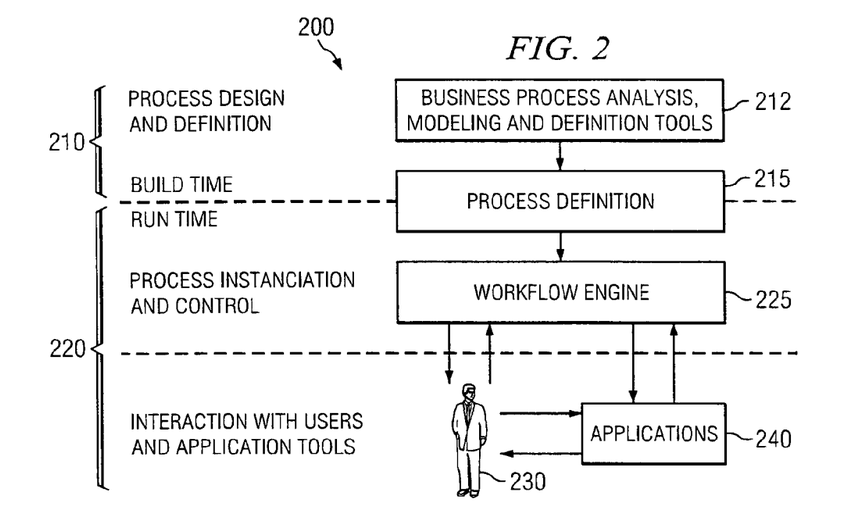
FIG. 2 presents a schematic illustrating one embodiment of a workflow management system.

As noted earlier, workflow management systems can provide procedural automation of business processes by management of the sequence of work activities and the invocation of appropriate human and/or computer resources associated with various steps in a process. FIG. 2 presents a schematic illustrating one embodiment of a workflow management system 200. Workflow management system 200 can be implemented in one or more phases, including build time phase 210 and run time phase 220. In build time phase 210, an organization can translate a process from real world activities into a process definition that can be used by a workflow engine (i.e., can create a computer prosecutable process definition). For example, an organization can use modeling and definition tools 212 to create process definition 215. It should be noted that each workflow engine may have a different syntax for representing process definition 215. Therefore, a representation of process definition 215 in one workflow engine may be incompatible with another workflow engine. Process definition 215 can comprise a number of discrete activity steps with associated computer and/or human operations and rules governing the progression of the process through the various activity steps. In one embodiment of the present invention workflow definition 215 can be dynamically updated during by activities of run time phase 220.

During run time phase 220, process definition 215 can be interpreted by workflow engine 225 that can be responsible for creating and controlling process instances based on the process definition, scheduling the various activities defined by the process definition, and invoking the appropriate human and IT applications to carry out the activities. Further, during run time phase 220, many interactions with human users 230 and applications 240 can occur. For example, activities within a workflow process can require human interaction, often done in conjunction with a particular software application 240 (e.g., filing in electronic forms), or can require information processing operations that utilize a particular application 240 to operate on a piece of content (e.g., updating a content item in a database). Workflow engine 225 can transfer control between activities, ascertain the operational status of processes, and invoke applications 240 to process the appropriate data or to pass data to user 230.

There are a variety of workflow engines 225 known in the art. However, each workflow engine typically has a custom API. The API allows applications 240 to interact with the underlying processes of the workflow engine 225 to achieve workflow management tasks. Thus, if an organization utilizes multiple workflow engines 225, applications 240 must typically be developed for each workflow engine. Additionally, because each workflow engine 225 can have its own API, interoperability between different applications 240 can be limited. Embodiments of the present invention, however, can provide a standards-based API that allows applications 240 to interact with a variety of workflow engines 225.

Figure 3:
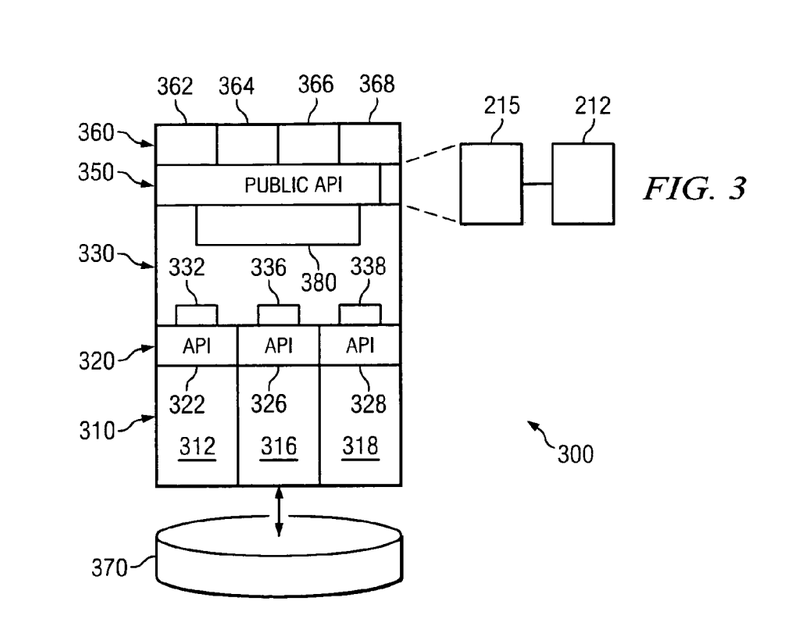
FIG. 3 illustrates one embodiment of a software architecture for providing a public API for multiple workflow engines.

FIG. 3 illustrates a software architecture 300 for providing a public API for multiple workflow engines. Architecture 300 can comprise a workflow engine layer 310, workflow engine API layer 320, API adapter layer 330, public API layer 350 ("public API 350"), and application layer 360. Additionally, Architecture 300 can include a content management layer 380 and persistent storage 370. Workflow engine layer 310 can include multiple workflow engines, such as workflow engine 312, workflow engine 316, and workflow engine 318, capable of managing the processes defined by an organization. Each workflow engine can be a vendor-specific workflow engine. For example, workflow engine 312 can be the IBM® MQ series workflow engine, workflow engine 316 can be the BEA® Process Integrator workflow engine, and workflow engine 318 can be the Vignette® PWS workflow engine. Each workflow engine can include an associated vendor-specific API in workflow engine API layer 320. For example, workflow engine 312 can be associated with API 322, workflow engine 316 can be associated with API 326, and workflow engine 318 can be associated with API 328. Each API allows programmers to build applications that are compatible with the underlying workflow engine. Thus, for example, API 322 can provide native objects to allow programmers to develop applications compatible with the IBM® MQ series workflow engine (i.e., workflow engine 312). As noted earlier, because each API in API layer 320 can be vendor-specific, applications developed for API 322 can be incompatible with API 326 or API 328.

In one embodiment of the present invention, public API 350 can provide a common interface with the workflow engines in workflow engine layer 310 on which to base client applications in application layer 360 (e.g., client application 362, client application 364, client application 366 and client application 368). As will be discussed in greater detail below, Public API 350 can comprise a collection of generic objects to represent the functionality of the underlying workflow engines (i.e., public API 350 can maintain a "generic object model"). Thus, Public API 350 can represent an abstraction that is generic with respect to the underlying workflow engines of workflow engine layer 310. Adapter layer 330 can provide translation and mapping of generic objects in public API 350 to and from the native objects of a particular workflow engine. For example, adapter 332 can map public API 350 to workflow engine API 322, workflow adapter 336 can map public API 350 to workflow engine API 326, and adapter 338 can map public API 350 to workflow engine API 328. In this manner, operations that occur utilizing public API 350 can be mapped to the native language of underlying workflow engines. Because public API 350 can present a standardized API that is generic to the underlying workflow engines, applications in application layer 360 can be created to interface with a standardized API rather than with vendor-specific APIs. In this manner, the same application can utilize multiple workflow engines that may themselves have different APIs.

In one embodiment of the present invention, public API 350 can maintain generic objects based on the reference model (the "Reference Model") provided by the Workflow Management Coalition. The Workflow Management Coalition is a non-profit international organization of workflow vendors, customers and users whose mission is to promote standards in workflow management. The standards promulgated by the Workflow Management Coalition are well know in the art.

By maintaining an object model based on the Reference Model, public API 350 can adapt industry standard interfaces to a configurable, extensible collection of underlying workflow engines. This can provide a consistent workflow programming model despite the variation found in vendor-specific APIs (e.g., the APIs of API layer 320) exposed by the underlying workflow engines (e.g. the workflow engines of workflow engine layer 310).

The public API 350 can comprise a collection of classes that can encapsulate the data and methods associated with workflow-related objects. In one embodiment of the present invention in which public API 350 comprises objects based on the Reference Model, public API 350 can comprise generic objects within the following classes: WfDefinition, WfProcessMgr, WfProcess, WfRequestor, WfActivity, WfAssignment, WfResource, WfUser, WfGroup, WfRole, and WfEventAuditBundle. As would be understood by one of ordinary skill in the art, these classes correspond to various interfaces developed by the Workflow Management Coalition. Furthermore, the classes provided are not limiting of the present invention and are provided by way of example only.

The WfDefinition class can encapsulate a single workflow process definition 215 as an object. Process definition 215 can be maintained as a WfDefinition object in addition to being maintained as a native definition object in a particular workflow engine. A WfDefinition object can be maintained for each workflow process defined by an organization (or user) and WfDefinition objects can be persistently stored at persistent storage 370 or other computer readable memory. In operation, an organization or user can create a process definition 215 using modeling and definition tools 212. The user can import the process definition 215 to public API 350.

In other words, public API 350 can maintain a representation of the process definition 215 as an object in public API 350. In one embodiment of the present invention, process definition 215 can be maintained in XPDL format, which is a XML-based process definition specification authored by the Workflow Management Coalition and governed by a publicly-available Document Type Definition ("DTD").

Upon importation of process definition 215, the adapters of adapter layer 330 can translate process definition 215 into the process definition syntax that can be used by each workflow engine. For example, adapter 336 can translate process definition 215 into a syntax usable by workflow engine 312 (e.g., can translate XPDL into an FDL representation). Thus, both a standard process definition representation can be maintained (i.e., as a WfDefinition object) at public API 350 and a vendor-specific process definition representation can be maintained at each workflow engine (i.e., a vendor-specific object for process definition 215 can be maintained in persistent storage 370 for each workflow engine in workflow engine layer 310). In this manner, workflow engines can operate with a native process definition representation while applications in application layer 360 can be written to a standard process definition representation (i.e., the WfObjects).

A WfProcessMgr object can represent a single workflow process definition that exists within the underlying workflow engine. In other words, WfProcessMgr object can be a run time manifestation of a process definition at a workflow engine (i.e., a WfProcessMgr object can represent the native workflow process definition maintained by a workflow engine). Accordingly, a WfProcessMgr object can be configured to manipulate a run time instance provided with the WfProcessMgr class, as will be described in greater detail below, to determine process input and output data and create run time instances of a process at a workflow engine. Furthermore, a WfProcessMgr object can be used to forward calls from an application interfacing with Public API 350 to the appropriate adapter in adapter layer 330 (i.e., the adapter corresponding to the workflow engine with which the WfProcessMgr object corresponds). For example, if a call is made to a WfProjectMgr object representing a run time instance processed by workflow engine 312, the WfProjectMgr object can route the request to adapter 332. As will be described in greater detail below, adapter 332 can map the call to a vendor-specific call defined by workflow engine API 322. Examples of calls (i.e., commands) supported by one embodiment of the WfProjectMgr object can include start, stop, pause, resume, and so on. Other commands can include a status command to determine if a particular process instance is running, whether it has started, etc. The calls provided are by way of example only and the WfProjectMgr objects can support other commands and methods, as would be understood by those of ordinary skill in the art. Methods can be provided with the WfProcessorMgr class, as will be described in greater detail below, to determine process input and out data and create run time instances.

A WfProcess object can represent a run time instance of a workflow process definition. Workflow processes can comprise activities (e.g., as represented by WfActivity objects, described below) that can be scheduled for execution according to process definition 215. Processes may include serial, parallel, branching, and looping control flows. A process instance may contain both manual and automatic activities defined by an associated WfDefinition. WfProcess object can be configured to retrieve status information on the process instance with which the WfProcess object is associated. Additionally, WfProcess objects can be configured to purge the underlying process instance with which the WfProcess object is associated. This may be desirable, for example, if there are a great many process instances running that significantly tax the resources of a workflow engine.

The WfRequestor object can represent a user responsible for creating a process instance. Put differently, a WfRequestor object can represent the owner of a process instance. As requestor, the user can be the notification target for significant events relating to the process instance, including escalation and completion. For example, the user represented by a WfRequestor object can be notified if a "fatal excetion" occurs in the process instance with which the WfObject can be associated. In one embodiment of the present invention the user represented by a WfRequestor object can also be the person who has the rights to start, stop, pause, resume, etc. the process instance with which the WfRequestor object is associated. Methods can be provided to determine the principal, determine the process instances owned by the principal, and send and receive notification events.

The WfActivity object can represent a single activity within a workflow process instance (as represented by a WfProcess object). Activities can be automated program tasks, manual tasks, or nested subprocesses. Automated programs can be executed automatically by an underlying workflow engine, while manual activities can involve assignments and interactions with human resources. In a WfActivity object, methods can be provided to determine the type, category of the activity (automated manual), regulate execution of an activity, get input/output parameters, and, for manual activities, activate, set output parameters, and mark an activity for completion.

A WfAssignment object can represent a single assignment linking a resource (discussed below) to a WfActivity. When a workflow engine initiates a manual activity (e.g., by sending a notification to a human user that an activity must be performed), assignment rules in WfDefinition can be used to determine the candidate resources to perform the activity. For each candidate, an assignment can be created with each assignment represented by a WfAssigment object. In one embodiment of the present invention, a first come/first served policy associates an assignment on behalf of the resource (e.g., the human) that first activates the activity. As would be understood by one of ordinary skill in the art, other assignment rules can include land leveling, round robin, random and other methods known in the art can be provided in a WfAssignment object to determine the resources assigned to an activity and to explicitly reassign an activity to a different resource.

A WfResource object can represent a resource used to perform an activity (e.g., as represented by a WfActivity object). In one embodiment of the present invention, a resource represented by a WfResources object can be a human or group of humans assigned (e.g., via a WfAssignment object) to an activity. The WfResource object can be extended to create subclasses of WfUser, WfGroup and WfRole. A WfUser object can represent a user (human) of the workflow system. A WfGroup object can encapsulate a workflow group to associate several users together. In addition, a WfRole objects can encapsulate a workflow related role and provide accessors for retrieving users and groups.

In addition to the objects already described, the WfEventAuditBundle object can define notification events concerning changes and conditions of run time subprocesses. Subclasses extending from this class can address various areas of notification and reporting. As would be understood by one of ordinary skill in the art, the foregoing classes correspond to the Reference Model provided by the Workflow Management Coalition. Therefore, the functionality of each of these classes is well understood.

Table 1 provides an exemplary set of methods that can be provided with the objects previously discussed. In some cases, the methods can be performed between generic objects in the public API 350. For example, a method for the WfDefinition object of "get process manager" can retrieve the names of process managers for a particular workflow definition. Other generic objects (and their methods) can be mapped to native objects in particular workflow engines (e.g., by adapters in adapter layer 330). Table 1 provides a list of exemplary generic objects, methods for those objects, and mappings between the generic objects and native objects of the underlying workflow engines. For the sake of explanation, the BEA® process integrator and IBM® MQ workflow will be used as the underlying workflow engines. It should be noted that Table 1 is provided by way of example only and is not limiting of the generic objects, methods, translations, or mappings that can be employed by embodiments of the present invention.

TABLE 1

| Objects and Methods | Description | Translation BEA ®/IBM ® |
|---|---|---|
| 1. WfDefinition | | |
| WfProcessMgr getProcessMgr | Can retrieve a process manager for this definition (i.e, retrieves a workflow engine specific process definition) | |
| String toXML( ) | Can return WfDefinition content in XML format. | |
| Void setDefaultWorkflow (WfDefaultBundle defBundle) | Can set this WfDefinition as the default for a specific object, all objects of a specific type, all objects of a specific deployment type and so on. | |
| ClearDefaultWorkflow (WfDefaultBundle defBundle) | Can remove an association as the default workflow process for a Create, Modify or Remove operation. | |

TABLE 1-continued

| Objects and Methods | Description | Translation BEA ®/IBM ® |
|---|---|---|
| WfDefaultBundle[ ] findAllDefaults( ) | Can find all default associations for this WfDefinition | |
| 2. WfProcessMgr. | | BEA ®: WfProcessMgr object can map to a TemplateDefinitionInfo object in BEA ® Process Integrator (PI) IBM ®: A WfProcessMgr can map to a ProcessTemplate object in MQ Workflow |
| WfProcess createProcess(ProcessData data) | Can create a process instance of the workflow definition associated with the process manager. Can return a WfProcess object. The initial state of the WfProcess object can be "open.not_running" | BEA ®: Call Worklist.intantiateWorkflow(String, orgId, String templateId) IBM ®: Call ProcessTemplate.CreateInstance( ) to create the ProcessInstance object. Instanitate a WfProcess object with this ProcessInstance and return it. |
| WfProcess createProcess(WfRequestor requester, ProcessData data) | Can create a process instance of the workflow definition associated with the process manager. Can return a WfProcess object. The initial state of the WfProcess object can be "open.not_running" | BEA ®: Call Worklist.intantiateWorkflow(String, orgId, String templateId) IBM ®: Call ProcessTemplate.CreateInstance( ) to create the ProcessInstance object. Instanitate a WfProcess object with this ProcessInstance and return it. |
| WfDefinition getDefinition( ) | Can get the corresponding WfDefinition, if one exists. | |
| ProcessDataInfo getInputProcessDataInfo( ) | Can get the meta data for the process inputs. Can return a ProcessDataInfo object that represents the context metadata for this process template. This is a collection of DataInfo objects that describe all data items that are visible in the process scope. A DataInfo object contains a name, datatype name, and an optional description. (See also the discussion on ProcessData.) | BEA ®: Call Admin.getInstanceVariables passing in the instance id of the workflow instance. A java.util.List object is returned containing VariableInfo objects which are containers for name value pairs. Each VariableInfo object has a getName and getValue. There is no optional description. IBM ®: If ProcessTemplate.InContainerNeeded( ), then may have to create a ProcessInstance( ) to obtain the input container. TBD. |
| ProcessDataInfo getOutputProcessDataInfo( ) | Can get the metadata for the process outputs. Can return a ProcessDataInfo object that represents the metadata for result data produced by an instance of this process template. This is a collection of DataInfo objects that describe all data items that are in the process result data set. A DataInfo object contains a name, datatype name, and an optional description. (See also the discussion on ProcessData.) | BEA ®: Views the process data as global and doesn't differentiate between the inputs and outputs (results). Use the same method as described for context_signature above. IBM ®: If ProcessTemplate.OutContainerNeeded( ), then call ProcessTemplate.OutContainerName( ) to retrieve the name of the out container for this process template. May have to create a ProcessInstance in order to get the OutputContainer. Then use the Container to enumerate the leaf elements. TBD. |
| Int getProcessCount( ) | Can return the number of process instances for this process manager. | IBM ®: Call ExecutionService.QueryProcessInstances( ) with a predicate of "TOP_LEVEL_PROCESS_NAME= '<process-mgr-name>'". The user must have access rights to these instances. Return the size of the resulting array. |
| WfProcess[ ] getProcesses( ) | Can get all WfProcess. | BEA ®: Call WLPIPrincipal.getUserInfo passing in the userId. This returns a UserInfo object. Obtain a list of organizations that this user belongs to by calling WLPIPrincipal.getOrganizationsForUser( ). This returns a list of OrganizationInfo objects. Call OrganizationInfo.getOrgId( ) for each OrganizationInfo object. For each orgId pass into |

TABLE 1-continued

| Objects and Methods | Description | Translation BEA ®/IBM ® |
|---|---|---|
| | | Worklist.getCallableWorkflows to obtain a list of callable workflows that are accessible for this user.<br>IBM ®:<br>Call ExecutionService.QueryProcess Instances( ) with a predicate of "TOP_LEVEL_PROCESS_NAME= '<process-mgr-name'". The user must have access rights to these instances. Return the size of the resulting array. |
| Boolean isEnabled( ) | True if this process manager is enabled. | BEA ®: InstanceInfo.getState( ). Returns either WORKFLOW STATE SUSPENDED or WORKFLOW STATE ACTIVE.<br>IBM ®: MQ Workflow ProcessTemplates do not have a disabled/enabled state, but they have a timestamp after which they are considered valid. If the current time is after that timestamp (obtained by calling ProcessTemplate.ValidFromTime( )) or if the timestamp is null, return true. |
| Boolean isProcessMgr(WfProcess process) | True if the process argument is an instance created by this program manager. | IBM ®: Call ProcessInstance.ProcessTemplateName( ). If it matches the name of this ProcessMgr (obtained by calling Process Template.Name( ), return true. |
| Void setEnabled(Boolean enabled) | Can enable or disable this process manager. | IBM ®: throw an exception if the newState is 'disabled'. |
| 3. WfRequestor | The WfRequestor object represents the entity that requests execution of a process, and is the sink for notifications (events received from the workflow engine) about a running workflow process. (For our purposes, the WfRequestor will be created whenever a VCM client desires 'lightweight' notifications about workflow process events. If the underlying engine does not support notification, then this is a no-op. The mechanism for this notification is TBD.) Presently, WfRequestor is a stateful session bean, and not a derivative of WfEntity. That is probably influenced primarily by the fact that VWE does not recognize a requester object per se, nor persist any information about it. If other engines do treat requesters as first class objects with state, then perhaps it should be a WfEntity. | BEA ®: Weblogic has an EJB Audit object with one method called sendMessage which sends a text message to a JMS topic called jsm/AuditTopic. The text message is an xml document that is compliant with an audit message dtd. The dtd defines actions and who the requestor was (among many other things).<br>IBM ®: In MQ Workflow, asynchronous event notifications are only available via the C or Active X api. We may choose to implement a separate program that exists just for this purpose. It would receive events, and send them to the VCM via a JMS message queue. TBD. |
| String getName( ) | Can get the username associated with this requester. | |
| WfProcess[ ] getProcesses( ) | Can get the processes owned by this requester. | |
| Void receiveEvent (WfEventAuditBundle event) | Can receive an event. | |
| 4. WfProcess | | |
| WfActivity[ ] getActivities( ) | Can get the activities that currently exist for this process | |

TABLE 1-continued

| Objects and Methods | Description | Translation BEA ®/IBM ® |
|---|---|---|
| WfActivity[ ] getActivitiesInState (WfState state) | Can get the activities that currently exist for this process that are in the designated state. | BEA ®: Use Worklist.getTasks() which returns a java.util.List of tasks. Iterate over the list searching for specific state. The states of tasks can be as follows: STATUS_COMPLETE, STATUS_INACTIVE, STATUS_OVERDUE, STATUS_PENDING IBM ®: call ExecutionService.QueryItems( ) with a predicate the specifies the ProcessName and the desired activity state. (May need other clauses-tbd.) Create a WfActivity object for each WorkItem.ActivityInstance( ). Return the size of the resulting array. |
| Int getActivityCount( ) | Can get the number of activities instances that currently exist for this process. | BEA ®: Call Admin.getInstanceTasks (instanceID) to get a list of the tasks. Returns the length of the list. IBM ®: Call ExecutionService.QueryItems( ) with a predicate that specifies the ProcessName. (May need other clauses-tbd.) Return the size of the resulting array. |
| WfProcessMgr getManager( ) | Can get the process manager used to create this process. | IBM ®: Call ProcessInstance.ProcessTemplateName( ) to get the template name, then call ExecutionService.QueryProcessTemplates( ) to retrieve the template. Finally, create a WfProcessMgr for that template. |
| WfPayload getPayload( ) | Can get the payload corresponding to the process instance. | |
| WfRequester getRequester( ) | Can get the requester for this process instance. | BEA ®: InstanceInfo.getInitiator( ). Returns the workflow initiator id. IBM ®: Call ProcessInstance.ProcessAdmin( ). Use the result to populate a WfRequester object. |
| Boolean isProcess (WfActivity activity) | True if activity belongs to this process. | BEA ®: Call Admin.getInstanceTasks (instanceId) to get a list of the tasks. Search through the list, looking for a match on the TaskId. IBM ®: use the member to retrieve the ProcessInstance name (call ActivityInstance.ProcessInstanceName( )), then compare the name to the ProcessInstance.name( ). |
| Void setRequester (WfRequester req) | Can set the requester for this process instance. | |
| Void start( ) | Can start the process instance. | BEA ®: Call Worklist.instantiateWorkflow (orgId, templateId). Parse the resultant XML string to get the instanceID and the templateDefId. (OrgId The Start Node definition sets the required input variables.) IBM ®: Call ProcessInstance.Start2( ) |
| Note: The following four methods: resume, suspend, terminate and abort are not implemented as part of the API but are mentioned because of IBM ® support. | | |
| void resume( ) | Can restart a suspended process. (May only be issued by the WfRequestor of this process, or an Administrator.) | IBM ®: Call ProcessInstance.Resume( ). |
| void suspend( ) | Can suspend a running process. (May only be issued by the WfRequestor of this process, or an Administrator.) | BEA ®: IBM ®: Call ProcessInstance.Suspend( ). |
| void terminate( ) | Can terminate a running process. | BEA ®: Unable to find a method to terminate a running process. IBM ®: Call ProcessInstance.Terminate( ). |

TABLE 1-continued

| Objects and Methods | Description | Translation BEA ®/IBM ® |
|---|---|---|
| void abort( ) | Can abort a running process. | BEA ®: No method exists to abort a running process. |
| 5. wfActivity | | |
| void activate( ) | Can activate the activity. | |
| void complete( ) | Can complete the activity. | |
| Int getAssignmentCount( ) | Can get the number of assignments that exist for the activity. | IBM ®: Call ExecutionService.QueryItems( )with a predicate that specifies the Activity Name. (May need other clauses-tbd.) Return the size of the resulting array. |
| WfAssignment[ ] getAssignments( ) | Can get the assignments that exist for the activity. | IBM ®: Call ExecutionService.QueryItems( ) with a predicate that specifies the Activity Name. (May need other clauses-tbd.) Create a WfAssignment object for each WorkItem. Return the resulting array. |
| WfProcess getProcess( ) | Can get the process to which this activity belongs. | |
| Boolean isAssignedActivity (WfAssignment assignment) | True if this activity is associated with the assignment. | IBM ®: Call WorkItem.ActivityInstance( ) and see if the names match. |
| void complete( ) | Can change the state of the activity to completed. | IBM ®: WorkItem.Finish( ). (Note that this is really a work item operation. May have to query for the work item.) |
| 6. WfAssignment | | |
| WfActivity getActivity( ) | Can get the activity associated with this assignment. | IBM ®: Call WorkItem.ActivityInstance( ). Use the result to create a WfActivity object. |
| WfResource getAssignee( ) | Can get the resource associated with this assignment. | IBM ®: Call Item.Owner( ) to get the id of the owner. Create a WfUser object and return it. |
| Void setAssignee (WfResource resource) | Can reassign the assignment. | IBM ®: Call Item.Transfer( ) to move this work item to a different user. |
| 7. WfEventAuditBundle | | |
| void copyValuesTo (Bundle that) | Can copy property values to another bundle. | |
| Object get (IobjectProp prop) | Can retrieve a property from this bundle. | |
| WfId getActivityID( ) | Can retrieve the value of the activityID property. | |
| String getActivityName( ) | Can retrieve the value of the activityName property. | |
| WfEventType getEventType( ) | Can retrieve the value of the eventType property. | |
| WfId getProcessId( ) | Can retrieve the value of the processeId property. | |
| String getProcessMgrName( ) | Can retrieve the value of the processMgrName property. | |
| String getProcessMgrVersion( ) | Can retrieve the value of the processMgrVersion property. | |
| String getProcessName( ) | Can retrieve the value of the processName property. | |
| Date getTimestamp( ) | Can retrieve the value of the timestamp property. | |
| boolean hasActivityID( ) | Can determine whether the activityID property is present. | |
| boolean hasActivityName( ) | Can determine whether the activityName property is present. | |
| boolean hasEventType( ) | Can determine whether the eventType property is present. | |
| boolean hasProcessId( ) | Can determine whether the processed property is present. | |
| boolean hasProcessMgrName( ) | Can determine whether the processMgrName property is present. | |
| boolean hasProcessMgrVersion( ) | Can determine whether the processMgrVersion property is present. | |

TABLE 1-continued

| Objects and Methods | Description | Translation BEA ®/IBM ® |
|---|---|---|
| boolean hasProcessName( ) | Can determine whether the processName property is present. | |
| boolean hasTimestamp( ) | Can determine whether the timestamp property is present. | |
| void removeActivityId( ) | Can remove the value of the activityId property from this bundle. | |
| void removeActivityName( ) | Can remove the value of the activityName property from this bundle. | |
| void removeEventType( ) | Can remove the value of the eventType property from this bundle. | |
| void removeProcessId( ) | Can remove the value of the processId property from this bundle. | |
| void removeProcessMgrName( ) | Can remove the value of the processMgrName property from this bundle. | |
| void removeProcessMgrVersion( ) | Can remove the value of the processMgrVersion property from this bundle. | |
| void removeProcessName( ) | Can remove the value of the processName property from this bundle. | |
| void removeTimestamp( ) | Can remove the value of the timestamp property from this bundle. | |
| void set(IobjectProp prop, Object val) | Can set a property in this bundle. | |
| void setActivityId(WfId val) | Can set the value of the activityId property. | |
| void setActivityName(String val) | Can set the value of the activityName property. | |
| void setEventType(WfEventType val) | Can set the value of the eventType property. | |
| void setProcessId(WfId val) | Can set the value of the processId property. | |
| void setProcessMgrName(String val) | Can set the value of the processMgrName property. | |
| void setProcessMgrVersion(String val) | Can set the value of the processMgrVersion property. | |
| void setProcessName(String val) | Can set the value of the processName property. | |
| void setTimestamp(Date val) | Can set the value of the timestamp property. | |
| 8. WfUser | | |
| WfGroup[ ] getGroups( ) | Can retrieve the groups for this user. The first group in the array is the primary group for this user (reflecting an organizational hierarchy). (note that some workflow engines, such as IBM ® MQ Workflow, only allow the user to be a member of one group. In this case, the array can contain a single entry.) | |
| WfRole[ ] getRoles( ) | Can retrieve the roles for this user. | |
| 9. WfGroup | | |
| WfUser getManager( ) | Can retrieve the manager for this group. | |
| WfRole[ ] getRoles( ) | Can retrieve the roles that are assigned to this group. | |
| WfGroup[ ] getSubgroups( ) | Can retrieve the groups that are subordinate to this group. | |

TABLE 1-continued

| Objects and Methods | Description | Translation BEA ®/IBM ® |
|---|---|---|
| WfUser[ ] getUsers( ) | Can retrieve the users for this group. | |
| 10. WfRole | | |
| WfUser getManager( ) | Can retrieve the manager for this group | |
| WfRole[ ] getRoles( ) | Can retrieve the roles that are assigned to this group. | |
| WfGroup[ ] getSubgroups( ) | Can retrieve the groups that are subordinate to this group. | |
| WfUser[ ] getUsers( ) | Can retrieve the users for this group. | |

As can be understood from the foregoing discussion, public API 350 can comprise a set of generic objects to provide a standard interface for workflow applications. The objects of public API 350 can be based on the reference model provided by the Workflow Management Coalition, and thus the objects are readily understandable by those of ordinary skill in the art. One embodiment of the present invention can map generic objects and/or methods applied by objects of public API 350 to underlying workflow engines through an adapter layer 330 (i.e. can map generic objects to native objects). This allows applications in application layer 360 to utilize a single interface to access multiple underlying workflow engines. Additional adapters can be developed to "plug-in" new workflow engines to software architecture 300 as they are developed. Thus, embodiments of the present invention can provide an extensible plug-in architecture for workflow engines.

In addition to providing a common API (i.e., public API 350) for different workflow engines, embodiments of software architecture 300 can be configured to integrate workflow management with content management. Workflow management is becoming increasingly popular with organizations that are interested in content management, because content, before it is deployed, typically progresses through a development and deployment process. For example, in the case of a website provider, content may be developed by a website author and then edited by the website editor. Authoring and editing are typically manual activities (e.g., performed by a human) performed with the aid of web authoring software tools. The content is typically stored in a persistent storage (e.g., persistent storage 370). After editing, the content may progress through additional activities such as web page layout, which again, can again involve human and software interaction. When a content item is in a satisfactory condition to be made available on the Internet, a layout editor can mark the content for deployment. The content can then undergo various automatic activities. For example, a software program can promote the content to a queue for deployment and, at a predetermined time, deploy the content to the website. To efficiently manage activities such as these website developers are applying workflow management techniques.

Public API 350 can further comprise a WfPayload object to represent a "payload." The payload can associate various content items with a particular process instance. Thus, the WfPayload object can be a logical representation of content associated with a particular instance. When a particular process is initiated, the WfPayload object can be created to reference the content item(s) that is(are) the subject of that process (i.e., the WfPayload object can represent the "workflow" of a content management process). It should be noted that in one embodiment of the present invention a WfPayload object can be created for each process instance. This obviates the need to generate a new "whole" clause every time a new activity is implemented in a process. Thus, a payload can be used by activity implementations (i.e., by the manual activities or automated activities) during a workflow process instance to locate the content item that is the object of the activity. An activity can search, delete, modify and/or otherwise manipulate the content associated with the payload (based on the nature of the activity).

For example, one activity may be the creation of a text file for display of an on-line article. After a human has produced the text file and saved it to persistent storage 370, an index of where the text file is saved can be inserted into the payload so that downstream activities (e.g., perhaps an edit and review activity) can access the content item (i.e., the text page). In one embodiment of the present invention the payload can be similar to a directory structure. If the text file from the previous example is saved at "A/B/text.txt", the payload can include an entry for "A/B/text". Alternatively, the payload can contain only an entry for "A/B". In such a case, all content items stored in directory, A/B can be associated with the same process. In another embodiment of the present invention, the payload can contain URL's, glossaries, or references to other content items for use in activity processing. The payload can also include environmental variables, that can be used, for example, to determine the state of a transition during a workflow instance. Thus, the payload object allows activities in a process to locate content items upon which to act. As an example, the payload may include the primary key for a database in which the text file is stored, and so on. Based on the payload (as represented by a WfPayload object), applications in applications layer 360 can locate content items without detailed knowledge of the schema for persistent storage 370. In other words, applications in application layer 360 can locate content items based on the WfPayload object rather than having to repetitively query persistent storage 370 for the locations of content items.

Table 2 is an exemplary table for a WfPayload object used to track content items for a particular work process instance. The methods of Table 2 are presented by way of example only and, as would be understood by those of ordinary skill in the art, additional or alternative methods can be included in a particular WfPayload object.

TABLE 2

| Object/Method | Description |
|---|---|
| WfPayload | |
| Void addContent (ObjectID id) | Adds a content item to the payload |
| Void removeContent(ObjectID id) | Removes a content item from the payload |

Software architecture 300 can further include a content management layer 380. Content management layer 380 can include additional content management functionality such as scheduling particular workflow instances, creating reports, monitoring, logging and other such processes known in the art. Placing such programming at content management layer 380 alleviates the need to repetitively program certain tasks in applications layer 360 for each application.

It should be noted that the reference model and XPDL, are intended to establish the standards to which workflow solution providers can comply, thereby facilitating portability and interoperability among various workflow engines. However, these standards are ahead of current practice and existing workflow engines typically employ proprietary APIs. Unlike prior art workflow engines, which typically require proprietary APIs and custom architecture, embodiments of the present invention can be configured to adapt industry standards to an extensible set of off-the-shelf workflow engines. An application can be written once, based on standard public API 350, and reused with multiple underlying workflow engines. Thus, an organization implementing the present invention can be isolated from proprietary engine's dependencies, enabling integration and migration among an extensible set of workflow engines. Additionally, if a particular workflow engine's API (e.g., API 322, API 326 or API 328) is reprogrammed, the adapter (e.g., adapter 332, adapter 336, or adapter 338) can be reprogrammed. Because the adapters that map objects from public API 350 to objects in the vendor specific APIs (i.e., the APIs of API layer 320) can be reprogrammed, applications written to public API 350 can remain unchanged. Thus, if there are four applications in application layer 360 written to public API 350 and workflow engine API 322 changes (e.g., the vendor provides a new version), adapter 332 can be modified accordingly. The reconfiguration of adapter 332 can be significantly less time consuming than modifying all four applications in applications layer 360.

The embodiments of the present invention can map a Reference Model object to counterparts in the various workflow engines. Thus, software infrastructure 300 will adapt noncompliant workflow engines with a standardized API (e.g., public API 350). It should be noted that while the Reference Model is defined using COBRA\IDL, software architecture 300 can be adapted to remote methods of invocation used in the J2EE specification. As would be understood by one of ordinary skill in the art, the classes and objects defined in the Reference Model can be mapped to entity and session enterprise JavaBeans with home and remote interfaces known in the art. Additionally, software infrastructure 300 can be adapted to non-J2EE environments, including the COBRA environments envisioned by the reference model.

Figure 4:
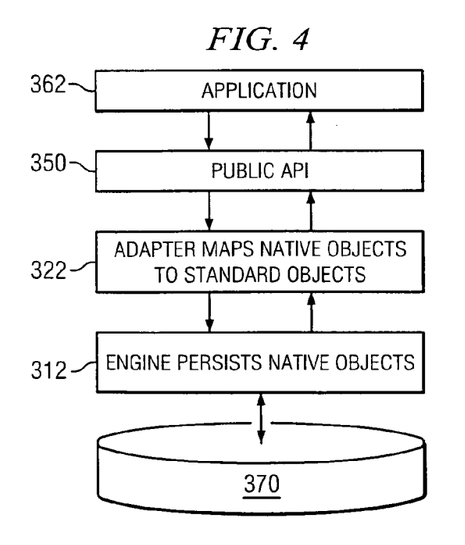
FIG. 4 is a schematic illustrating one embodiment of a method for serving client workflow requests, commands, and/or calls.

FIG. 4 is a schematic illustrating one embodiment of the method for serving client workflow requests, commands and/or calls. When an application (e.g., application 362) makes a workflow request/call/command, the request/call/command can be communicated to public API layer 350 that operates on the generic objects maintained at that layer (e.g., the objects corresponding to the Reference Model). At public API layer 350, the WfProcessMgr can forward the request/command/call to the appropriate adapter in adapter layer 330 for the appropriate running process instance represented by the WfProcessMgr object at public API layer 350. The adapter at adapter layer 330 (e.g., adapter 332) can conform a command/request/call to the native language for the workflow engine's specific API in workflow engine API layer 320 (i.e., can translate the call received from public API layer 350 into the syntax employed by workflow engine API 322).

Thus, adapter 332 can conform calls/commands/requests from public API layer 350 to calls/commands/requests understandable by workflow engine API 322. The workflow engine associated with workflow engine API 322 (e.g., workflow engine 312) can then process the call/command/request by retrieving or otherwise manipulating content items from persistent storage 370, or by otherwise manipulating content. The results returned by workflow engine 312 can similarly be mapped to generic results usable by one or more of the generic objects of public API 350 via adapter 332.

It should be noted that the workflow engines (e.g., workflow engine 312, workflow engine 316 and workflow engine 318) can create and persist as necessary objects corresponding to processes activities, resources, assignments and audit events. Accordingly, in one embodiment of the present invention, objects corresponding to process, activities, resources, assignments and audit events (e.g. WfProcess, WfActivity, WfAssignment, and WfEventActivityBundle) are not persisted at public API layer 50. Instead, they can be delegated to objects in the workflow engines through the mapping provided by the adapters of adapter layer 330. As an example, to satisfy a request to browse a work list, public API layer 350 can create a collection of WfActivity objects for a current WfResource. The WfActivity objects can be created dynamically by interrogating the appropriate workflow engine (i.e., the workflow engine processing a particular process instance with which the workflow activities are associated). WfActivity object in public API layer 350 can be delegated to a corresponding object in an underlying workflow engine defined in the adapter layer 330. An adapter in adapter layer 330 (e.g., adapter 322), can translate the operations propagated by public API layer 350 to the native representation for the underlying workflow engine and vice versa. The results yielded by the workflow engine can be converted by adapter 322 to the standardized API or public API layer 350 to dynamically create the appropriate WfActivity objects.

Figure 5:
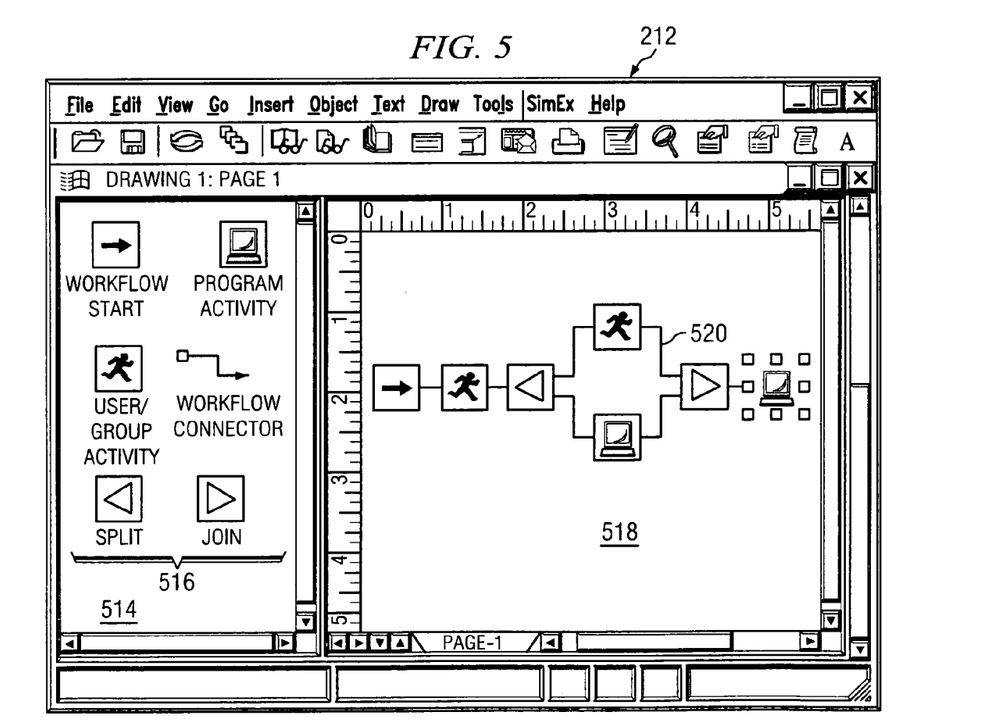
FIG. 5 illustrates one embodiment of a modeling and definition tool.

FIG. 5 illustrates one embodiment of a modeling and definition tool 212 for providing process definition 215. Modeling and definition tool 212 can include a stencil 514 containing a set of master shapes 516. Each master shape and set of master shapes 516 can be dragged onto drawing page 518. Drawing page 518 can hold shapes and connectors to form a diagram. Using modeling and definition tool 212, a user can define a process by linking or connecting representation of manual and automatic activities. Using master shapes 516, the user can drag and drop to create a visual representation 520 of process definition 215, as would be understood by those of ordinary skill in the art. Modeling and Definition tool 212 can be used to define a variety of process definitions 215, that can include parallel, serial, optional and required activities. When a user has finished creating a process definition, the process definition can be saved and converted to XPDL format for importation to public API 350. It should be noted that in another embodiment of the present invention, process definition 215 can be imported into a particular application in application layer 360 (e.g., application 364). The application can then be propagate process definition 215 down to public API layer 350 where it can be represented by a WfDefinition object.

Figure 6:
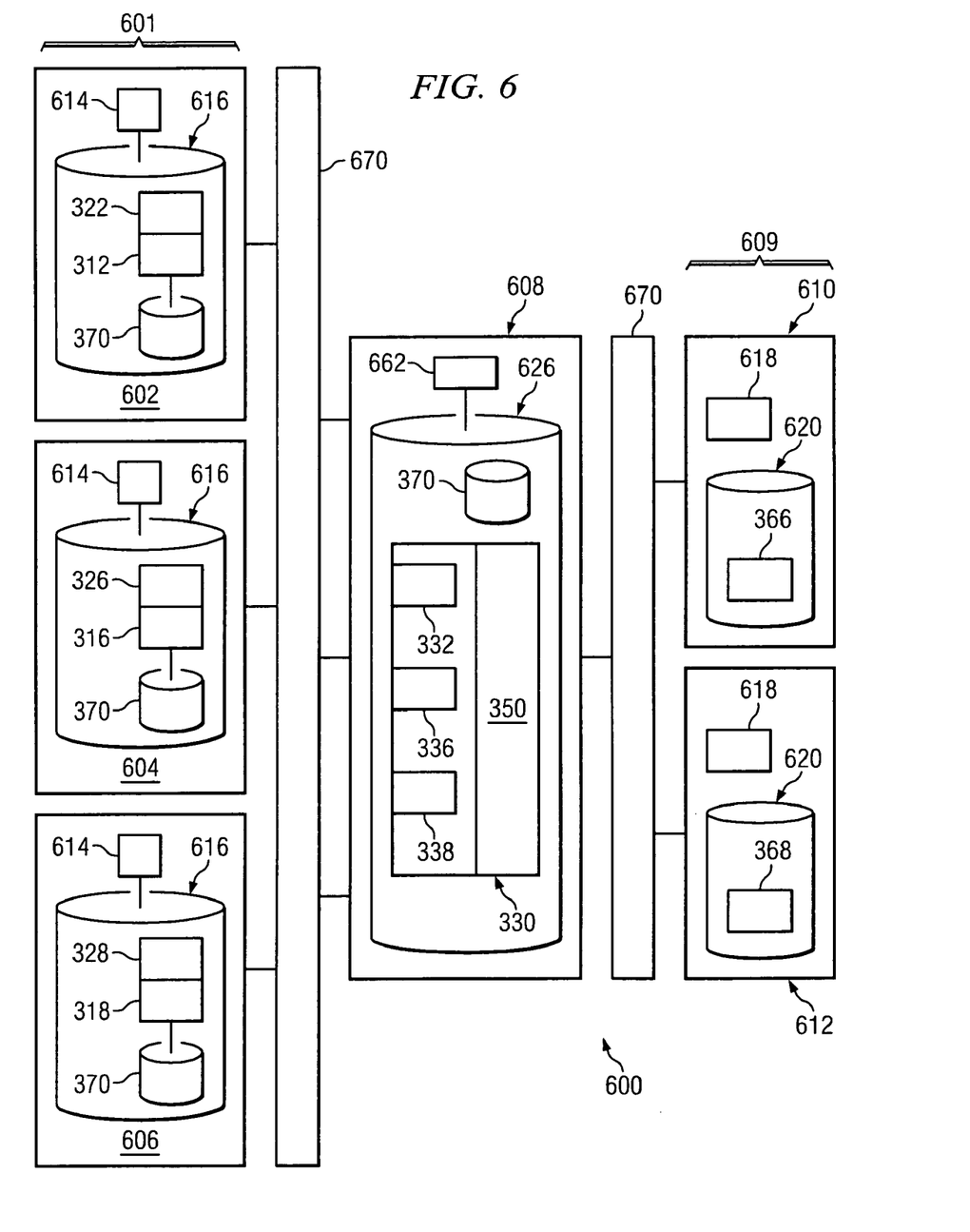
FIG. 6 illustrates one embodiment of a system in which an embodiment of the software architecture of the present invention can be implemented.

FIG. 6 illustrates one embodiment of the system 600 according to the present invention. System 600 can comprise one or more workflow engine servers 601 (e.g., workflow engine server 602, workflow engine server 604 and workflow engine server 606), intermediate server 608, and one or more application servers 609 (e.g., application server 610 and application server 612). Each workflow engine server 601 can include a CPU 614 and a computer readable memory 616. Computer readable memory 616 can comprise RAM, ROM, magnetic storage devices or other computer-readable memories known in the art, and can include software instructions corresponding to an associated workflow engine and API. For example, computer-readable memory 616 of workflow engine server 602 can comprise software instructions corresponding to workflow engine 312 and API 322. Additionally the computer-readable memory 616 of each workflow engine server 601 can comprise a portion of persistent memory 370 (i.e., persistent memory 370 can be distributed).

Similarly, application servers 609 (e.g., application server 610, application server 612) can include a CPU 618 and a computer-readable memory 620. Computer-readable memory 620 can comprise RAM, ROM, magnetic storage devices or any other computer-readable memory known in the art. Each computer-readable memory 620 of application servers 610 and 612 can contain an application configured to interface with public API 350. Thus, for example, application server 610 can contain application 366 and application server 612 can contain application 368.

Intermediate server 608 can also comprise a CPU 662 and a computer-readable memory 626 that can include software programming operable to implement public API 350 and adapter layer 330 with associated adapters 336, 336 and 338. Additionally, computer-readable memory 626 can include a portion of persistent memory 370. Again, computer readable memory 626 can comprise RAM, ROM, magnetic storage devices or any other computer-readable memory known in the art.

Further, each workflow engine server 601, application server 609 and immediate server 608 can comprise software programming and network interfaces operable to communicate over network 670. Network 670 can comprise any computer network known in the art operable to transport data, including LANS, WANs, Global Area Networks, such as the Internet, and wireless networks.

In operation, public API layer 350 can comprise a generic object model representing a standard interface. When a call/request/command is received from an application (e.g., application 366), public API 350 can forward the call or command to the appropriate adapter in adapter layer 330 (e.g., adapter 332). Adapter 332 can translate the call or command into a native call or command for a particular workflow engine (e.g., workflow engine 312) and forward the call or command to workflow engine 312 via the workflow engines API (e.g., workflow engine API 322). Adapter 332 can also map any response provided by workflow engine 312 to the generic objects of pubic API layer 350.

In this manner, native objects from various workflow engines can be mapped to a set of generic objects at API layer 350. Consequently, applications can be written for a single API (e.g. Public API 350), but can be applied to multiple underlying workflow engines. Thus, the present invention can provide an extensible workflow architecture. It should be noted that system 600 is provided by way of example only and that the functionality of software architecture 300 can be distributed among any number of computer systems (e.g., servers) or can all be contained on the same computer system.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for interfacing applications comprising computer executable software instructions stored on a computer readable memory, said computer executable software instructions operable to implement:

a public application program interface (public API) layer useful for writing applications consistent with a set of heterogeneous vendor-specific workflow engines,
    wherein each workflow engine is a software program operable to manipulate content items in accordance with a process definition,
    wherein said public API layer includes a set of generic objects representing functional characteristics common to said set of heterogeneous vendor-specific workflow engines,
    wherein each of said set of generic objects is a self-contained data entity,
    wherein said set of generic objects comprises a generic process definition object, and
    wherein each of said set of heterogeneous vendor-specific workflow engines comprises an engine-specific application program interface (engine-specific API); and an API adapter layer having a plurality of adapters for translating instructions from said public API layer to vendor-specific instructions,
    wherein each adapter is configured to interface with an engine-specific API, and
    operable to map said set of generic objects to a set of native objects for a corresponding underlying workflow engine, and
    wherein each of said plurality of adapters is operable to translate said generic process definition object into a native process definition object for said corresponding underlying workflow engine.

2. The system of claim 1, said computer executable software instructions further operable to implement a content management layer, wherein said set of generic objects further comprises a payload object for indexing content items that are the subject of a process instance, wherein said process instance is an invocation of the process definition.

3. The system of claim 2, wherein indexed content items are searchable by said applications via said content management layer.

4. The system of claim 1, wherein each of said set of heterogeneous vendor-specific workflow engines maintains and operates with a vendor-specific process definition representation and wherein said applications are written to a standard process definition representation maintained at said public API layer.

5. The system of claim 1, wherein said set of generic objects are maintained at said public API layer according to a workflow reference model promulgated by the Workflow Management Coalition.

6. The system of claim 5, wherein said set of generic objects comprises a WfDefinition object, a WfProcessMgr object, a WfProcess object, a WfRequestor object, a WfActivity object, a WfAssignment object, a WfResource object, a WfEventAuditBundle object, a WfUser object, a WfGroup object, and a WfRole object.

7. The system of claim 6, wherein said set of generic objects further comprises a WfPayload object.

8. A system for interfacing workflow applications comprising computer executable software instructions stored on a computer readable medium, said computer executable software instructions operable to implement:
  a first workflow engine;
  a first workflow engine application program interface (workflow engine API) associated with said first workflow engine, wherein said first workflow engine API comprises a first set of native objects;
  a second workflow engine;
  a second workflow engine API associated with said second workflow engine, wherein said second workflow engine API comprises a second set of native objects, wherein said first workflow engine and said second workflow engine are heterogeneous vendor-specific workflow engines;
  a public application program interface (public API) layer comprising a set of generic objects representing functional characteristics common to the heterogeneous vendor-specific workflow engines, wherein said set of generic objects comprises a generic process definition object; and
  an API adapter layer comprising:
    a first adapter configured to map said set of generic objects of said public API layer to said first set of native objects of said first workflow engine API, wherein said first adapter is operable to translate said generic process definition object into a first native process definition object; and
    a second adapter configured to map said set of generic objects of said public API layer to said second set of native objects of said second workflow engine API, wherein said second adapter is operable to translate said generic process definition object into a second native process definition object.

9. The system of claim 8, said computer executable software instructions further operable to implement a content management layer, wherein said set of generic objects further comprises a payload object for indexing content items that are the subject of a process instance, wherein said process instance is an invocation of a process definition.

10. The system of claim 9, wherein indexed content items are searchable by one or more applications via said content management layer.

11. The system of claim 8, wherein each of said first and second workflow engines maintains and operates with a vendor-specific process definition representation.

12. The system of claim 8, wherein said set of generic objects are maintained at said public API layer according to a workflow reference model promulgated by the Workflow Management Coalition.

13. The system of claim 12, wherein said set of generic objects comprises a WfDefinition object, a WfProcessMgr object, a WfProcess object, a WfRequestor object, a WfActivity object, a WfAssignment object, a WfResource object, a WfEventAuditBundle object, a WfUser object, a WfGroup object, and a WfRole object.

14. The system of claim 13, wherein said set of generic objects further comprises a WfPayload object.

15. A computer-implemented method for integrating workflow engines comprising:
  creating a public application program interface (public API) layer for at least two heterogeneous underlying workflow engines, wherein the public API layer comprises a set of generic objects,
  wherein said set of generic objects represent functional characteristics common to said at least two heterogeneous underlying workflow engines,
  wherein each of the at least two heterogeneous underlying workflow engines is a computer executable application program operable to manipulate content items in accordance with a process definition,
  wherein each of said at least two heterogeneous underlying workflow engines has an associated engine-specific application program interface (workflow engine API) and a set of native objects;
  interfacing said public API layer with said at least two heterogeneous underlying workflow engines through an API adapter layer having a plurality of adapters, wherein each workflow engine API associated with said at least two heterogeneous underlying workflow engines corresponds to one of said plurality of adapters of said API adapter layer;
  mapping said set of generic objects of said public API layer to native objects of each of said at least two heterogeneous underlying workflow engines to integrate said at least two heterogeneous underlying workflow engines to said public API layer; and
  translating a generic process definition object into a native process definition object.

16. The method of claim 15, further comprising:
  persistently maintaining the generic process definition object; and
  delegating at least a portion of said set of generic objects of said public API layer to a set of corresponding native objects at one or more of said underlying workflow engines.

17. The method of claim 16, further comprising persistently maintaining said native process definition object.

18. The method of claim 15, further comprising:
  receiving a call from an application understandable by a generic object of said set of generic objects;
  mapping said call from said application to a native call understandable by a native object of a workflow engine API;
  executing said native call to generate a native result; and
  mapping said native result to a generic result usable by a generic object of said set of generic objects.

19. The method of claim 15, further comprising creating a content management layer, wherein said set of generic objects further comprises a payload object for indexing content items that are the subject of a process instance, wherein said process instance is an invocation of the process definition.

20. The method of claim 19, wherein indexed content items are searchable via said content management layer.

21. The method of claim 15, wherein each of said at least two heterogeneous underlying workflow engines maintains and operates with a vendor-specific process definition representation.

22. The method of claim 15, wherein said set of generic objects are maintained at said public API layer according to a workflow reference model promulgated by the Workflow Management Coalition.

23. The method of claim 22, wherein said set of generic objects comprises a WfDefinition object, a WfProcessMgr object, a WfProcess object, a WfRequestor object, a WfActivity object, a WfAssignment object, a WfResource object, a WfEventAuditBundle object, a WfUser object, a WfGroup object, and a WfRole object.

24. The method of claim 23, wherein said set of generic objects further comprises a WfPayload object.

25. A computer-implemented method for providing a standardized application program interface between a plurality of software applications and a plurality of workflow engines, said method comprising:
- creating and maintaining a public application program interface (public API) layer comprising a set of generic software objects;
  - wherein said set of generic software objects represent functional characteristics common to at least two heterogeneous workflow engines;
  - wherein each of said at least two heterogeneous workflow engines is a computer executable application program operable to manipulate content items in accordance with a process definition;
  - wherein each of said at least two heterogeneous workflow engines has an engine-specific workflow engine application program interface (workflow engine API) associated therewith;
  - wherein each workflow engine API comprises a set of native software objects; and
  - wherein the workflow engine APIs of said at least two heterogeneous workflow engines are vendor-specific; and
- translating and mapping said set of generic software objects of said public API layer to and from said set of native software objects of said each workflow engine API through an API adapter layer having a plurality of adapters, each of which corresponds to a workflow engine API, wherein each of said plurality of software applications is operable to generate calls understandable by said set of generic software objects of said public API layer, and wherein translated calls are understandable by said at least two heterogeneous workflow engines, and wherein each of said plurality of adapters is operable to translate a generic process definition object into a native process definition object for a corresponding workflow engine of said at least two heterogeneous workflow engines.

* * * * *